United States Patent
Burgess et al.

(10) Patent No.: US 9,011,966 B2
(45) Date of Patent: Apr. 21, 2015

(54) POLYURETHANE FOAM ARTICLE AND METHOD OF FORMING SAME

(75) Inventors: Kevin Burgess, Toronto (CA); Greg Gardin, Cambridge (CA); Jian Ying Zang, Mississauga (CA); Chris Janzen, Milton (CA)

(73) Assignee: BASF SE, Ludwigshafen (DE)

( * ) Notice: Subject to any disclaimer, the term of this patent is extended or adjusted under 35 U.S.C. 154(b) by 355 days.

(21) Appl. No.: 13/163,334

(22) Filed: Jun. 17, 2011

(65) Prior Publication Data

US 2011/0311793 A1 Dec. 22, 2011

Related U.S. Application Data

(60) Provisional application No. 61/356,212, filed on Jun. 18, 2010.

(51) Int. Cl.
| | |
|---|---|
| *C23C 16/52* | (2006.01) |
| *B32B 3/12* | (2006.01) |
| *B32B 3/26* | (2006.01) |
| *C08G 18/00* | (2006.01) |
| *B29C 44/06* | (2006.01) |
| *C08J 9/00* | (2006.01) |
| *C08G 18/40* | (2006.01) |

(Continued)

(52) U.S. Cl.
CPC ............. *B29C 44/06* (2013.01); *C08J 9/0004* (2013.01); *C08J 9/0014* (2013.01); *C08J 2375/04* (2013.01); *C08G 18/4018* (2013.01); *C08G 18/482* (2013.01); *C08G 2101/0025* (2013.01)

(58) Field of Classification Search
CPC ............. B32B 5/20; B32B 2266/0278; B32B 2307/4026; C08G 18/832; C08G 2330/00; C08G 2330/004026
USPC ................... 427/8, 427.3; 428/160
See application file for complete search history.

(56) References Cited

U.S. PATENT DOCUMENTS

| | | | | |
|---|---|---|---|---|
| 4,666,949 | A | * | 5/1987 | Shimizu et al. ............... 521/114 |
| 4,775,748 | A | | 10/1988 | Kluger et al. |

(Continued)

FOREIGN PATENT DOCUMENTS

| | | |
|---|---|---|
| EP | 1938791 A2 | 7/2008 |
| WO | WO 03004766 A2 | 1/2003 |
| WO | WO 2009127182 A1 * 10/2009 | ............. G01N 21/78 |

OTHER PUBLICATIONS

Griffin et al., Manual of Low-Slope Roof Systems, 2006, McGraw-Hill, 4th Ed.*

(Continued)

*Primary Examiner* — Melissa Rioja
(74) *Attorney, Agent, or Firm* — Howard & Howard Attorneys PLLC

(57) ABSTRACT

A polyurethane foam article comprises a first lift, a second lift, and a pass-line therebetween. The polyurethane foam article comprises the reaction product of an isocyanate-reactive resin composition, an isocyanate, and an indicator dye in the presence of a blowing agent. The indicator dye imparts a color in the first and second lifts and at the pass-line at a first temperature below a decomposition temperature of the indicator dye. The indicator dye chemically decomposes to impart a change in color in the first and second lifts and at the pass-line at a second temperature which is at or above the decomposition temperature of the indicator dye.

24 Claims, 2 Drawing Sheets

(51) Int. Cl.
  *C08G 18/48* (2006.01)
  *C08G 101/00* (2006.01)

(56) References Cited

U.S. PATENT DOCUMENTS

| | | | |
|---|---|---|---|
| 4,912,203 A | 3/1990 | Kluger et al. | |
| 4,923,903 A | 5/1990 | Alm et al. | |
| 5,052,380 A | 10/1991 | Polta | |
| 5,864,002 A | 1/1999 | Stephens et al. | |
| 6,077,927 A | 6/2000 | Stephens et al. | |
| 6,534,556 B2 | 3/2003 | Lacarte et al. | |
| 7,056,958 B2 | 6/2006 | Xia et al. | |
| 7,173,101 B2 | 2/2007 | Xia | |
| 7,199,164 B2 | 4/2007 | Xia et al. | |
| 7,226,961 B2 | 6/2007 | Park et al. | |
| 7,337,985 B1 * | 3/2008 | Greer et al. | 239/11 |
| 2004/0209969 A1 | 10/2004 | Arlt et al. | |
| 2005/0282016 A1 | 12/2005 | Ogonowski et al. | |
| 2006/0052468 A1 * | 3/2006 | Janzen et al. | 521/130 |
| 2011/0024690 A1 * | 2/2011 | John et al. | 252/408.1 |
| 2011/0059255 A1 * | 3/2011 | Ogonowski | 427/422 |
| 2014/0179814 A1 * | 6/2014 | Mooney et al. | 521/131 |

OTHER PUBLICATIONS

Material Safety Data Sheet—Methyl Violet, LabChem Inc., Dec. 2007.*
Material Safety Data Sheet—Bromothymol, Acros Organics, Sep. 2006.*
Moore, "New Uses for Highly Miscible Liquid Polymeric Colorants in the Manufacture of Colored Urethane Systems," Cellular Plastic, Jul./Aug. 1983, pp. 221-226.

* cited by examiner

US 9,011,966 B2

POLYURETHANE FOAM ARTICLE AND METHOD OF FORMING SAME

CROSS-REFERENCE TO RELATED APPLICATIONS

This patent application claims priority to and all advantages of U.S. Provisional Patent Application No. 61/356,212, filed on Jun. 18, 2010, which is hereby incorporated by reference in its entirety.

BACKGROUND OF THE INVENTION

1. Field of the Invention

The subject invention generally relates to a polyurethane foam article and a method of forming the polyurethane foam article. More specifically, the subject invention relates to a method of forming a polyurethane foam article comprising the reaction product of an isocyanate-reactive resin composition, an isocyanate, and an indicator dye, in the presence of a blowing agent.

2. Description of the Related Art

Use of polyurethane foam articles throughout transportation, building, and other industries is known in the art. In the building industry, polyurethane foam articles are used to insulate structures. As insulation, a polyurethane foam article functions as a seamless and maintenance-free air barrier, which provides many benefits, such as prevention of moisture infiltration and mold growth and reduction of heating and air conditioning costs.

As is also known in the art, the polyurethane foam article is formed from an exothermic reaction of an isocyanate-reactive resin composition and an isocyanate in the presence of a blowing agent. The isocyanate-reactive resin composition, the isocyanate, and the blowing agent, collectively known as a polyurethane system, are selected to optimize application efficiency and performance properties of the polyurethane foam article for a particular use. For example, when using the polyurethane foam article to insulate structures, the components of the polyurethane system are selected such that the performance properties, e.g., insulative, adhesive, and other properties, of the polyurethane foam article formed therefrom are optimized.

To form the polyurethane foam article, the isocyanate-reactive resin composition and the isocyanate are typically mixed in the presence of the blowing agent to form a reaction mixture and the reaction mixture is applied as required for a particular use. The reaction mixture can be applied with an application technique, such as spraying, pouring, or injection molding. Like the components of the polyurethane system, the particular application technique is selected to optimize application efficiency and the performance properties of the polyurethane foam article for a particular use. Slight variations in the application technique affect the performance properties of the polyurethane foam article. Consequently, certain guidelines are often set forth for the application technique. For instance, when forming the polyurethane foam article to insulate structures, the reaction mixture is typically spray applied at a spray angle of 90° relative to a substrate, in well-defined and properly directed passes to form layers, or lifts. The lifts are typically between 12 and 50 mm thick. The lifts are spray applied for efficiency and to control an exotherm, which results from the exothermic reaction. Should the thickness of a lift exceed 50 mm, the exotherm generated could cause the lift to discolor, split, scorch, burn, inadequately adhere to the substrate, and other problems. If the polyurethane foam article having a desired thickness of greater than 50 mm is required, multiple lifts are formed to achieve the desired thickness. To form the polyurethane foam article having the desired thickness of greater than 50 mm, the reaction mixture is spray applied to form a first lift, the first lift is allowed to cool, and the reaction mixture is sprayed thereon to form a second lift. The first lift must cool prior to formation of the second lift so that the exotherm generated during the formation of the second lift is controlled such that the second lift does not discolor, split, scorch, burn, and/or inadequately adhere to the first lift at a pass-line, or interface, between the first and the second lift. Furthermore, the guidelines set for the application technique, as set forth above, are followed for the formation of additional lifts if required to achieve the desired thickness.

In the field, a contractor typically purchases the polyurethane foam system from a supplier. In turn, the contractor, who has contracted with a third party, applies the polyurethane system at a jobsite to form the polyurethane foam article. If the polyurethane foam article does not perform as expected, a field failure occurs, such as cracking, discoloration, blistering, adhesive failure, lift delamination, and/or poor insulation properties. When field failure occurs, warranty issues arise. When warranty issues arise, it is necessary to determine a root cause of the field failure so that a responsible party, typically either the supplier or the contractor, can be held accountable. Determining a root cause of the field failure can be difficult. This leaves the polyurethane foam system supplier and the contractor at odds.

The field failure can occur due to various reasons, such as quality problems with the polyurethane system, improper mixing of the polyurethane system, and improper application technique. For example, the field failure can occur when guidelines set forth for the spray application technique, as described above, are not followed. In some cases, lifts of improper thickness, i.e., lifts of greater than 50 mm, are formed to save time thereby resulting in field failure. In such cases, a cross-section of the polyurethane foam article can be visually examined, thickness of the lifts can be measured, the root cause of the failure can be determined, and responsibility for warranty issues can be placed on the contractor. In other cases, even though lifts of proper thickness are formed, the lifts are formed in quick succession with inadequate cooling. In such cases it is difficult to determine the root cause of the field failure that results.

In response to the needs outlined above, the polyurethane system has been developed to optimize the performance properties of the polyurethane foam article. In addition, the application technique has been selected and developed to ensure optimum performance of the polyurethane foam article as insulation. Despite such development, field failure still occurs and the need to determine the root cause for the field failure remains. As such, there remains a need to further improve the polyurethane foam article.

SUMMARY OF THE INVENTION AND ADVANTAGES

The subject invention provides a polyurethane foam article which comprises a first lift, a second lift, and a pass-line therebetween, and the reaction product of an isocyanate-reactive resin composition, an isocyanate, and an indicator dye, in the presence of a blowing agent. The indicator dye imparts a color in the first and second lifts and at the pass-line at a first temperature below a decomposition temperature of the indicator dye. The indicator dye chemically decomposes to impart a change in color in the first and second lifts and at the pass-line at a second temperature which is at or above the decomposition temperature of the indicator dye.

The subject invention also provides a method of forming the polyurethane foam article on a substrate. The method comprises numerous steps, including the steps of providing the isocyanate-reactive resin composition, providing the isocyanate, and providing the indicator dye. The method also comprises the step of combining the isocyanate-reactive resin composition, the isocyanate, and the indicator dye in the presence of the blowing agent to form a reaction mixture. The method further comprises the step of applying the reaction mixture onto the substrate to form the first lift with the indicator dye imparting the color in the first lift, and if a temperature of the indicator dye meets or exceeds the decomposition temperature of the indicator dye the indicator dye chemically decomposes to impart a change in color in the first lift. The method still further comprises the step of applying the reaction mixture onto the first lift to form the second lift with the pass-line therebetween and with the indicator dye imparting the color in the second lift, and if a temperature of the indicator dye meets or exceeds the decomposition temperature of the indicator dye, the indicator dye chemically decomposes to impart a change in color in the second lift and at the pass-line.

Advantageously, the polyurethane foam article of the subject invention improves upon current polyurethane foam articles such as those used for insulation. The change in color imparted by the indicator dye in the lifts and at the pass-line allows for a determination of a root cause of a field failure. Consequently, the field failure can be rectified immediately thereafter. In addition, because the polyurethane foam article of the present invention allows for the determination of the root cause of the field failure, contractors and others are deterred from forming the polyurethane foam article with improper application techniques.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
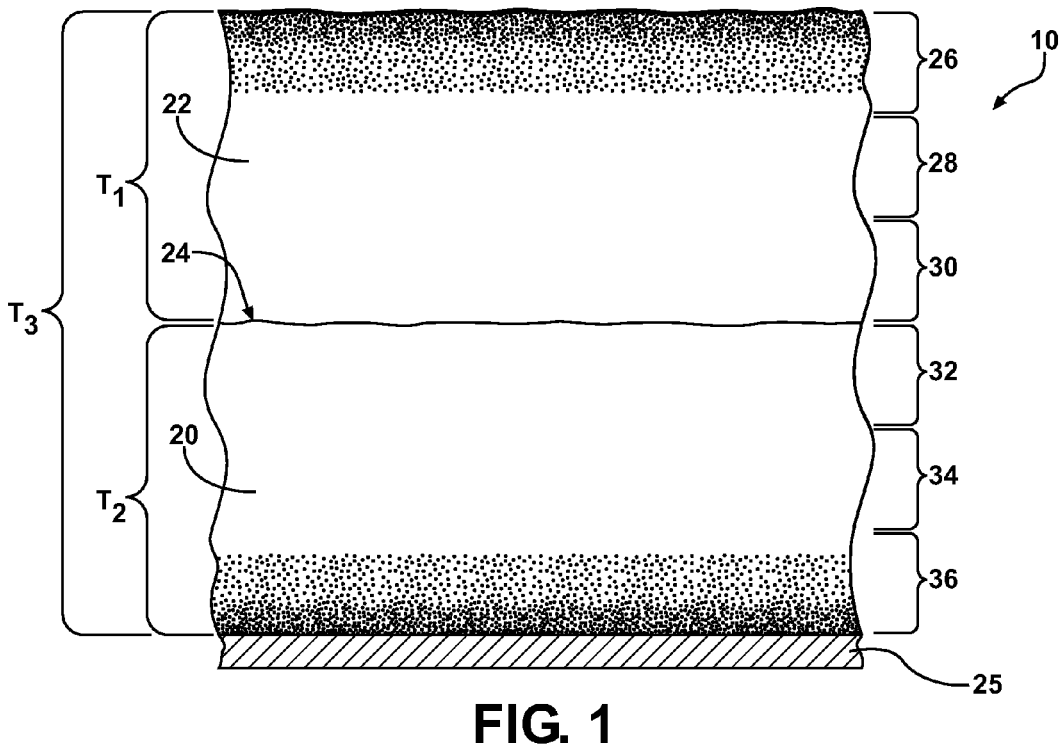
FIG. 1 is a cross-sectional view of a polyurethane foam article according to this invention, with a second lift being formed on a first lift 2 minutes after the first lift is formed.

A polyurethane foam article is disclosed. The polyurethane foam article of the present invention is typically used to insulate structures. As insulation, the polyurethane foam article functions as a seamless and maintenance-free air barrier, which provides many benefits, such as prevention of moisture infiltration and mold growth and reduction of heating and air conditioning costs. The polyurethane foam article comprises two or more lifts. Ultimately, a number of lifts required is dictated by a desired thickness of the polyurethane foam article. The lifts result from an exothermic reaction of a polyurethane system comprising an isocyanate-reactive resin composition, an isocyanate, and an indicator dye, in the presence of a blowing agent. The polyurethane system is selected to optimize application efficiency and performance properties of the polyurethane foam article for a particular use. For example, when using the polyurethane foam article to insulate structures, the components of the polyurethane system are selected such that the performance properties, e.g., insulative, adhesive, and other properties, of the polyurethane foam article formed therefrom are optimized.

The polyurethane system of the present invention comprises the isocyanate-reactive resin composition. The isocyanate-reactive resin composition comprises a polyol. The polyol may include one or more polyols and typically includes a combination of polyols. The polyol includes one or more OH functional groups, typically at least two OH functional groups. Typically, the polyol is selected from the group of polyether polyols, polyester polyols, polyether/ester polyols, and combinations thereof; however, other polyols may also be employed. More specifically, the polyol is typically selected from the group of: an amine initiated polyether polyol typically having a number average molecular weight of from about 250 to about 800 and more typically of from about 255 to about 305 g/mol, typically having a hydroxyl number of from about 300 to about 900 and more typically of from about 725 to about 875 mg KOH/g, and typically having a functionality of from about 2 to about 5 and more typically of from about 3.5 to about 4.5; a polyester polyol typically having a number average molecular weight of from about 300 to about 700 and more typically of from about 325 to about 650 g/mol, typically having a hydroxyl number of from about 180 to about 450 and more typically of from about 190 to about 415 mg KOH/g, and typically having a functionality of from about 1.9 to about 2.5 and more typically of from about 2 to about 2.45; a Mannich based polyether polyol typically having a number average molecular weight of from about 250 to about 660 and more typically of from about 322 to about 522 g/mol, typically having a hydroxyl number of from about 300 to about 600 and more typically of from about 325 to about 525 mg KOH/g, and typically having a functionality of from about 2.5 to about 5 and more typically of from about 2.7 to about 3.7; a sucrose initiated polyether polyol typically having number average molecular weight of from about 460 to about 1200 and more typically of from about 530 to about 930 g/mol, typically having a hydroxyl number of from about 280 to about 570 and more typically of from about 310 to about 410 mg KOH/g, and typically having a functionality of from about 4 to about 6.5 and more typically of from about 3.7 to about 5.7; and combinations thereof. Of course, the number average molecular weight, hydroxyl number, and the functionality of the polyol or polyols may be any value or range of values, both whole and fractional, within those ranges and values described above and/or may vary from the values and/or range of values above by ±5%, ±10%, ±15%, ±20%, ±25%, ±30%, etc. The polyol can be included in the isocyanate-reactive resin composition in various amounts.

A suitable polyol is JEFFOL® A-800 commercially available from Huntsman of The Woodlands, Tex. JEFFOL® A-800 is an amine initiated polyether polyol having a number average molecular weight of about 280 g/mol, a hydroxyl number of about 800 mg KOH/g, and a functionality of about 4. Another suitable polyol is TERATE® 4026 commercially available from Invista, Charlotte, N.C. TERATE® 4026 is a polyester polyol having a number average molecular weight of about 560 g/mol, a hydroxyl number of about 200 mg KOH/g, and a functionality of about 2. Yet another suitable polyol is JEFFOL® R425X commercially available from Huntsman of The Woodlands, Tex. JEFFOL® R425X is a Mannich based polyether polyol having a number average molecular weight of about 422 g/mol, a hydroxyl number of about 425 mg KOH/g, and a functionality of about 3.2. Still another suitable polyol is JEFFOL® SG-360 commercially available from Huntsman of The Woodlands, Tex. JEFFOL® SG-360 is a sucrose initiated polyether polyol having a number average molecular weight of about 730 g/mol, a hydroxyl number of about 360 mg KOH/g, and a functionality of about 4.7. Still yet another suitable polyol is a bio-based polyol such as glycerine or castor oil. As demonstrated above, number average molecular weight, hydroxyl number, and functionality of the polyol can vary. As such, the polyols referenced above are exemplary in nature and are not to be construed as limiting.

The isocyanate-reactive resin composition typically comprises a catalyst. The catalyst may include one or more catalysts and typically includes a combination of catalysts. The catalyst is typically present in the isocyanate-reactive resin composition to catalyze the exothermic reaction between the isocyanate-reactive resin composition and the isocyanate. It is to be appreciated that the catalyst is typically not consumed in, the exothermic reaction between the isocyanate-reactive resin composition and the isocyanate. That is, the catalyst typically participates in, but is not consumed in the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc. If included, the catalyst can be included in various amounts.

In addition to the catalyst, the isocyanate-reactive resin composition may optionally include a surfactant. The surfactant typically supports homogenization of the blowing agent and the polyol and regulates a cell structure of the polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. A particularly suitable surfactant is LK-221 commercially available from Air Products Corporation of Allentown, Pa. If included, the surfactant may be included in the isocyanate-reactive resin composition in various amounts.

In addition to the surfactant, the isocyanate-reactive resin composition may optionally include a flame retardant. The flame retardant may include any suitable flame retardant or mixtures of flame retardants known in the art. Non-limiting examples of suitable flame retardants include tricresyl phosphate, tris(2-chloroethyl)phosphate, tris(2-chloropropyl) phosphate, tris(2,3-dibromopropyl)phosphate, red phosphorous, aluminum oxide hydrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, melamine, and corn starch. If included, the flame retardant can be included in the isocyanate-reactive resin composition in various amounts.

The isocyanate-reactive resin composition may optionally include one or more additives. The additive may include any suitable additive or mixtures of additives known in the art. Suitable additives for purposes of the present invention include, but are not limited to, chain-extenders, cross-linkers, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the isocyanate-reactive resin composition in various amounts.

The polyurethane system of the present invention also comprises the isocyanate. The isocyanate of this invention may be a single isocyanate or may include a mixture of isocyanates. The isocyanate may be any type of isocyanate known to those skilled in the art. The isocyanate may be a polyisocyanate having two or more functional groups, e.g. two or more NCO functional groups. Suitable isocyanates for purposes of the present invention include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used for purposes of the present invention include, but are not limited to, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Specific examples of suitable isocyanates include ELASTOSPRAY® 8000A, ELASTOPOR® P1000U, LUPRANATE® L5120, LUPRANATE® M, LUPRANATE® ME, LUPRANATE® MI, LUPRANATE® M20, LUPRANATE® M70, and LUPRANATE® M17, all commercially available from BASF Corporation of Florham Park, N.J.

In a preferred embodiment, the isocyanate is ELASTOSPRAY® 8000A. ELASTOSPRAY® 8000A comprises polymeric isocyanates, such as polymeric diphenyl methane diisocyanate, and also comprises monomeric isocyanates. ELASTOSPRAY® 8000A has a molecular weight of about 360 g/mol.

The polyurethane system of the present invention also comprises the indicator dye. The indicator dye of the subject invention may include a single indicator dye or may include a mixture of indicator dyes. Typically, a dye is applied in a solution and a pigment is not. For purposes of the present invention the indicator dye can be a dye, a pigment or combinations thereof. The indicator dye may be provided with the isocyanate-reactive resin composition, provided with the isocyanate, or provided separately. Generally, the indicator dye is a compound having a color. Although the indicator dye described herein has a color which is violet or purple, the indicator dye of the present invention can have any color, such as yellow, orange, peach, green, or blue. Accordingly, the indicator dye imparts the color in the first and second lifts and at the pass-line of the polyurethane foam article.

The indicator dye is selected from the group of acid dyes, basic dyes, anionic direct dyes, cationic direct dyes, natural dyes, and combinations thereof. Specific indicator dyes that may be used include, but are not limited to, anthraquinone dyes, azo dyes, and triphenyl methane dyes. Specific examples of suitable indicator dyes include BASAZOL® 60L, BASAZOL® 47L, BASAZOL® 57L, BASAZOL® 45L, all commercially available from BASF Corporation of Florham Park, N.J.

In a preferred embodiment the indicator dye is BASAZOL® 45L. BASAZOL® 45L is a triphenylmethane type dye which imparts a violet color in the lifts and at the pass-line. In this embodiment, the indicator dye is provided with the isocyanate-reactive resin composition. Said differently, the indicator dye is mixed with the isocyanate-reactive resin composition prior to reacting the isocyanate-reactive resin composition and the isocyanate.

The indicator dye is typically present in the isocyanate-reactive resin composition in an amount of from about 0.001 to about 2, more typically in an amount of from about 0.015 to about 1.75, and most typically in an amount of from about 0.05 to about 1.5 percent by weight, based on 100 parts by weight of the isocyanate-reactive resin composition. When the indicator dye is present in the isocyanate-reactive resin composition in accordance with the ranges set forth above, the indicator dye imparts optimal color in the polyurethane foam article. However, it should be appreciated that the indicator dye can be present in the isocyanate-reactive resin composition in an amount of greater than 2 percent by weight based on 100 parts by weight of the isocyanate-reactive resin composition and still impart adequate color in the polyurethane article.

As described above, the indicator dye imparts a color in the first and second lifts and at the pass-line. However, the color imparted by the indicator dye in the lift may not be permanent. The indicator dye has a decomposition temperature. If a temperature of the indicator dye exceeds the decomposition temperature of the indicator dye, the indicator dye chemically decomposes. When the indicator dye chemically decomposes, the indicator dye breaks down to form one or more different compounds, which are different than the indicator dye. The different compounds do not have the same color as the indicator dye. As such, the color of the lift where the chemical decomposition of the indicator dye occurs changes color. Consequently, the chemical decomposition imparts a change in color in said first and second lifts and at said pass-line. Said differently, the indicator dye imparts a color in the first and second lifts and at the pass-line at a first temperature below a decomposition temperature of said indicator dye. Should temperature increase, the indicator dye chemically decomposes to impart a change in color in the first and second lifts and at the pass-line at a second temperature which is at or above said decomposition temperature of said indicator dye. So the change in color is the result of the temperature of the indicator dye exceeding the decomposition temperature of said indicator dye, typically during or after the exothermic reaction of the isocyanate-reactive resin composition and the isocyanate.

In a preferred embodiment, the decomposition temperature of the indicator dye is typically from about 80° C. to about 220° C., more typically from about 80° C. to about 200° C., still more typically from about 90° C. to about 200° C., and most typically is from about 120° C. to about 180° C.

As is known in the art, during the exothermic reaction of the isocyanate-reactive resin composition and the isocyanate, the blowing agent promotes the release of a blowing gas which forms voids, or cells, in the lift. The blowing agent of the present invention may be a physical blowing agent, a chemical blowing agent, or a combination thereof. In a preferred embodiment, the blowing agent comprises both a physical blowing agent and a chemical blowing agent, and the blowing agent is included in the isocyanate-reactive resin composition.

The physical blowing agent does not chemically react with the isocyanate-reactive resin composition and/or the isocyanate to provide a blowing gas. The physical blowing agent can be a gas or liquid. The physical blowing agent that is liquid typically evaporates into a gas when heated, and typically returns to a liquid when cooled. The physical blowing agent typically reduces the thermal conductivity of the polyurethane foam coating. Suitable physical blowing agents for the purposes of the subject invention may include hydrofluorocarbons (HFCs), hydrocarbons, and combinations thereof. Specific examples of suitable physical blowing agents include ENOVATE® HFA-245fa, which is commercially available from Honeywell of Morristown, N.J. and HCFC-141b and HCFC-142b, both of which are commercially available from Arkema of Philadelphia, Pa.

The chemical blowing agent chemically reacts with the isocyanate or with the isocyanate-reactive resin composition. Examples of chemical blowing agents that are suitable for the purposes of the subject invention include formic acid, water, and combinations thereof. A specific example of a chemical blowing agent that is suitable for the purposes of the subject invention is water.

The subject invention also provides a method of forming the polyurethane foam article on a substrate. The polyurethane foam article comprises the first lift, the second lift, and a pass-line therebetween. The polyurethane foam article results from an exothermic reaction of the polyurethane system comprising the isocyanate-reactive resin composition, the isocyanate, and the indicator dye, in the presence of a blowing agent. The method comprises numerous steps, including the steps of providing the isocyanate-reactive resin composition, providing the isocyanate, and providing the indicator dye. The method further comprises the step of combining the isocyanate-reactive resin composition, the isocyanate, and the indicator dye in the presence of the blowing agent to form a reaction mixture. The method also comprises the step of applying the reaction mixture onto the substrate to form the first lift with the indicator dye imparting a color in the first lift, and if a temperature of the indicator dye exceeds the decomposition temperature of the indicator dye during or after the exothermic reaction, the indicator dye chemically decomposes to impart a change in color in the first lift. And the method comprises the step of and applying the reaction mixture onto the first lift to form the second lift with the pass-line therebetween and with the indicator dye imparting the color in the second lift, and if a temperature of the indicator dye exceeds the decomposition temperature of the indicator dye during or after the exothermic reaction, the indicator dye chemically decomposes to impart a change in color in the second lift and at the pass-line.

The unreacted isocyanate-reactive resin composition, the isocyanate, the indicator dye, and the blowing agent are collectively referred to as the polyurethane system. As described above, the method includes the steps of providing the isocyanate-reactive resin composition, the isocyanate, and the indicator dye. In other words, the isocyanate-reactive resin composition, the isocyanate, and the indicator dye are supplied for use in the method. The indicator dye can be provided with the isocyanate-reactive resin composition, the isocyanate, or provided separately. In other words, the indicator dye can be included in the isocyanate-reactive resin composition or the isocyanate, or provided separately. Typically, the isocyanate-reactive resin composition and the isocyanate are formulated off-site and delivered to an area where they are used.

Typically, the polyurethane system, including the isocyanate-reactive resin composition and the isocyanate are supplied together. Initially, the components of the polyurethane system are selected to optimize application efficiency and performance properties of the polyurethane foam article for a particular use. For example, when using the polyurethane foam article to insulate structures, the components of the polyurethane system are selected such that the performance properties, e.g., insulative, adhesive, and other properties, of the polyurethane foam article formed therefrom are optimized.

Referring back to the method, the method also includes the step of combining the isocyanate-reactive resin composition with the isocyanate in the presence of the blowing agent to form the reaction mixture. In a preferred embodiment, the method includes the step of heating the isocyanate-reactive resin composition and the isocyanate to a temperature of from 25° C. to 60° C., and more preferably to a temperature of from 30° C. to 55° C., prior to the step of combining the isocyanate-reactive resin composition with the isocyanate in the presence of the blowing agent to form the reaction mixture. The isocyanate-reactive resin composition and the isocyanate may be combined by any mechanism known in the art to form the reaction mixture. Typically, the step of combining occurs in a mixing apparatus such as a static mixer, impingement mixing chamber, or a mixing pump. The isocyanate-reactive resin composition and the isocyanate may also be combined in a spray nozzle, so long as the reaction mixture is spray applied according to this invention. Typically, the isocyanate-reactive resin composition and the isocyanate are combined at an isocyanate index of from about 75 to 140, more typically from 80 to 130, still more typically from 90 to 130, yet still more typically from 90 to 120, and most typically from 100 to 115.

As indicated above, the method includes the step of applying the reaction mixture onto the substrate to form the first lift with the indicator dye imparting a color in the first lift, and if a temperature of the indicator dye exceeds the decomposition temperature of the indicator dye during or after the exothermic reaction, the indicator dye chemically decomposes to impart a change in color in the first lift. The reaction mixture can be applied with any application technique, such as spraying, pouring, or injection molding. Like the components of the polyurethane system, the particular application technique is selected to optimize application efficiency and the performance properties of the polyurethane foam article for a particular use. Slight variations in the application technique affect the performance properties of the polyurethane foam article. Consequently, certain guidelines are often set forth for the application technique.

In a preferred embodiment, the reaction mixture is spray applied. Typically, the reaction mixture is spray applied at a spray rate of from 1 to 40, more typically at a rate of from 4 to 35, still more typically at a rate of from 4 to 20, and most typically at a spray rate of from 6 to 30, lbs/min. Also, the mixture is typically spray applied at a pressure of greater than 250 psi, more typically at a pressure of from 800 to 1400 psi, and most typically at a pressure of from 850 to 1250 psi. It is contemplated that the reaction mixture may be spray applied at any rate or range of rates within the ranges set forth above. Similarly, it is contemplated that the reaction mixture may be spray applied at any pressure or range of pressures within the ranges set forth above. Typically, the reaction mixture is spray applied at ambient temperatures. In this embodiment, the reaction mixture is spray applied at a temperature of from about 5° C. to about 40° C. In another embodiment, the reaction mixture is spray applied a temperature of from about −10° C. to about 5° C. In other words, the polyurethane system can be selected to perform at certain temperatures. For example, a cold temperature grade polyurethane system can be selected for application in the winter months.

In this same embodiment, the reaction mixture is typically spray applied at a spray angle of from about 20° to about 160°, and more typically from about 70° C. to about 110° relative to the substrate, in well-defined and properly directed passes to form the lifts, or layers. Typically, the lifts have a thickness of from about 10 mm to about 60 mm. Preferably, the lifts are spray applied at the thickness of 50 mm or less for efficiency and to control an exotherm, which results from the exothermic reaction. Should the thickness of a lift exceed about 50 mm, the exotherm generated could cause the lift to discolor, split, scorch, burn, inadequately adhere to the substrate, and other problems. If the polyurethane foam article having a desired thickness of greater than 50 mm is required, multiple lifts are formed to achieve the desired thickness.

Accordingly, the method also includes the step of applying the reaction mixture onto the first lift to form the second lift with the pass-line therebetween and with the indicator dye imparting the color in the second lift. If a temperature of the indicator dye exceeds the decomposition temperature of the indicator dye during or after the exothermic reaction, the indicator dye chemically decomposes to impart a change in color in the second lift and at the pass-line.

To form the polyurethane foam article having the desired thickness of greater than 50 mm, the reaction mixture is spray applied to form the first lift, the first lift is allowed to adequately cool, and the reaction mixture is sprayed thereon to form the second lift. The first lift must cool prior to formation of the second lift so that the exotherm generated during the formation of the second lift is controlled such that the second lift does not discolor, split, scorch, burn, and/or inadequately adhere to the first lift at the pass-line, or interface, between the first and the second lift. Furthermore, the guidelines set for the application technique, as set forth above, are typically followed for the formation of additional lifts if required to achieve the desired thickness. That said, the polyurethane foam article of the present invention can comprise multiple lifts, e.g. two, three, four, five, six, and so on and so forth lifts.

The substrate upon which the reaction mixture is applied may be any surface but is typically a surface of a residential or commercial structure or building, such as a single or multiple family home, a modular home, or a business, that typically has at least three walls, a floor, and a roof. Most typically, the substrate is a wall, floor, or ceiling of the building. Typically, the substrate is a wall of a building and the reaction mixture is spray applied on the wall of the building on-site, i.e., at a construction location. The substrate upon which the reaction mixture is applied may be, but is not limited to, brick, concrete, masonry, dry-wall (e.g. SHEETROCK®), plaster, metal, stone, wood, plastic, a polymer composite, or combinations thereof. It is also contemplated that the substrate upon which the reaction mixture is spray applied may be a surface of a vehicle or machine component.

Referring back to the method, the method also includes the step of extracting a cross-section of the polyurethane foam article. The extraction can be accomplished with a variety of techniques know in the art such as manually cutting a piece of the foam from the polyurethane foam article. Once the cross-section is extracted, the method includes the step of visually examining the cross-section of the polyurethane foam article having at least one pass-line. A cross-section may be extracted for a variety of reasons. For example, the cross-section may be extracted to determine a number of lifts applied to form the polyurethane foam article, to determine whether the lifts are between 10 mm and 50 mm thick, and/or to determine the color in the first lift and the second lift at the pass-line. According to the present invention, if there is a color change at the pass-line, then the lifts were formed in quick succession with inadequate cooling. Said differently, if the first lift did not cool adequately and the second lift was formed thereon, the indicator dye present in the first and second lifts chemically decomposes and a concentration of indicator dye in the lift and at the pass-line is decreased, imparting the change in color in the second lift at the pass-line or in the first and second lifts, at the pass-line. In such cases, the temperature of the indicator dye exceeds the decomposition temperate of the indicator dye to impart the change in color. Accordingly, if the first and the second lift are formed and a third lift is formed on the second lift in quick succession without allowing adequate time for the second lift to cool, the change in color will occur in the second and the third lifts and at the pass-line therebetween.

Figure 2:
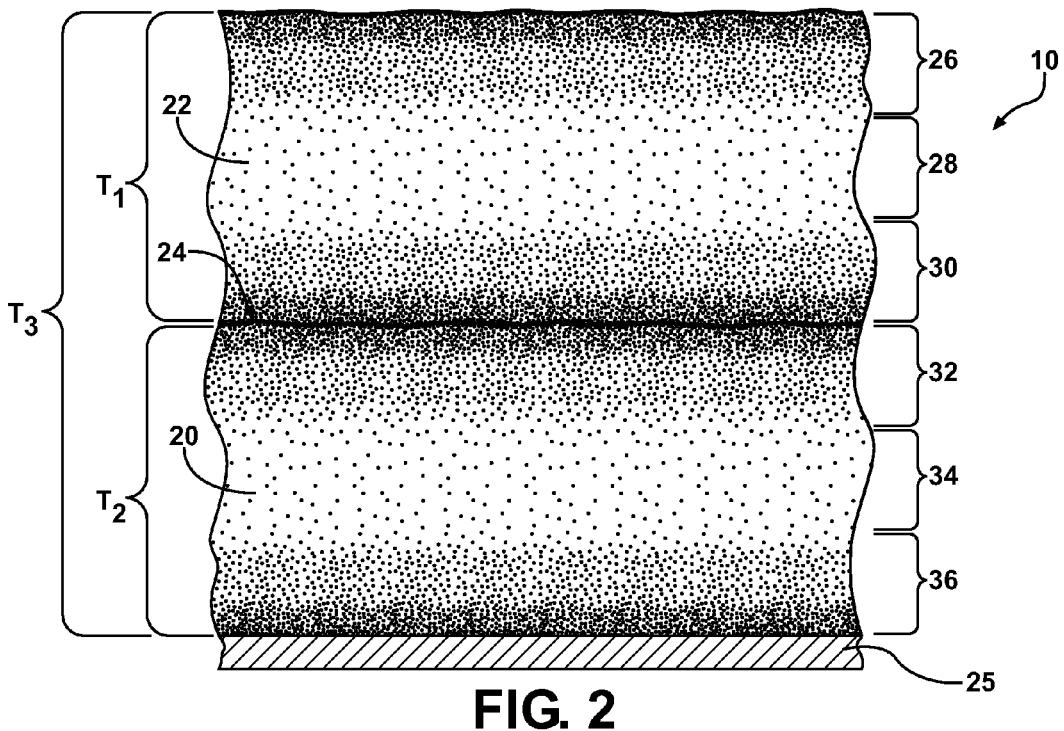
FIG. 2 is a cross-sectional view of a polyurethane foam article according to this invention, with a second lift being formed on a first lift 20 minutes after the first lift is formed.
Figure 3:
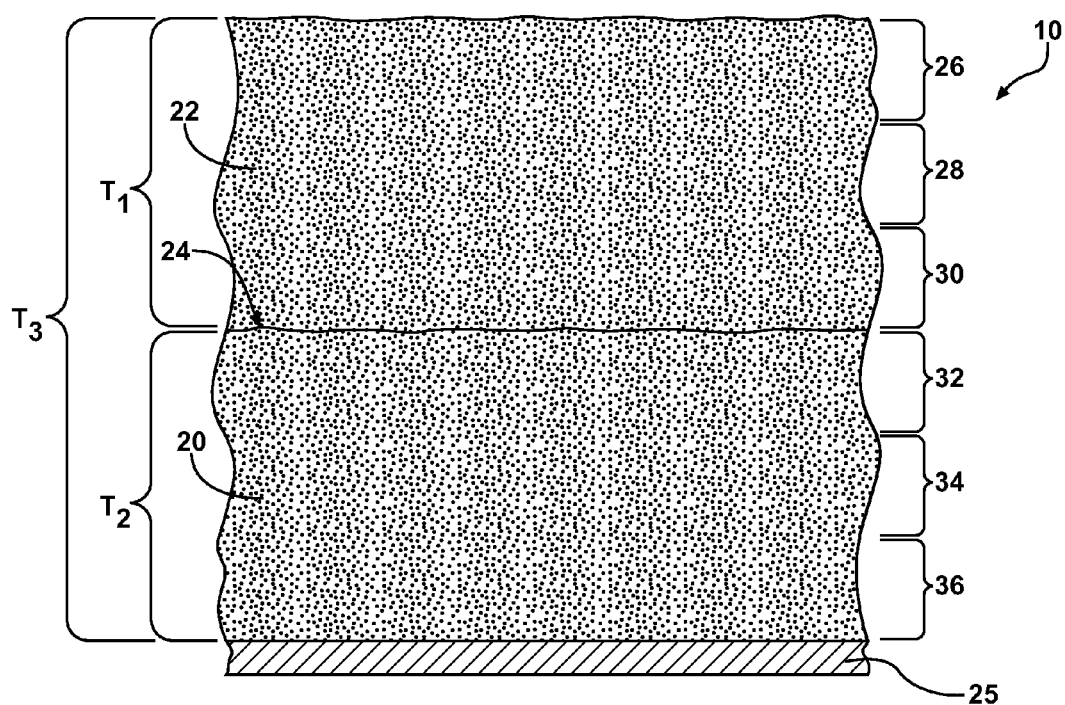
FIG. 3 is a cross-sectional view of the polyurethane foam article of the prior art comprising a first lift, a second lift and a pass line therebetween, with the second lift being formed on the first lift 2 minutes after the first lift is formed.

Referring to FIGS. 1-3, cross-sections of three polyurethane foam articles comprising a first lift 20, a second lift 22, and a pass-line 24 therebetween are illustrated. FIGS. 1 and 2 are polyurethane foam articles according to the present invention. However, FIG. 3 is a polyurethane foam article not according to the present invention. The polyurethane foam article of the present invention undergoes the change in color, via a decrease in indicator dye concentration, in the first and second lifts 20, 22 and at the pass-line 24 when the second lift 22 is formed onto the first lift 20 in quick succession without allowing adequate time for the first lift 20 to cool.

Referring now to FIG. 1, a cross-section of the polyurethane foam article of the present invention is generally shown at 10. The polyurethane foam article comprises the first lift 20, the second lift 22, and the pass-line 24 therebetween. The first lift 20 is formed by spray application of a reaction mixture onto a substrate 25. The second lift 22 is formed by spray application of the reaction mixture onto the first lift 20. The second lift 22 is formed 2 minutes after the first lift 20 is formed. When each of the first and the second lifts 20, 22 are formed, the indicator dye is concentrated or dispersed evenly in the lift, respectively, imparting a color in the respective lift. The first lift 20 has a thickness $T_1$ of about 50 mm and the second lift 22 has a thickness $T_2$ of about 50 mm. Accordingly, the polyurethane foam article 10 has a thickness $T_3$ of about 100 mm. For purposes of this description, the first and second lifts 20, 22 are each individually divided in into three areas and the areas are defined as areas 26, 28, 30, 32, 34, 36. The dots represent the indicator dye, which imparts the color in the first and second lifts 20, 22 and at the pass-line 24. In areas where there is a higher concentration of dots, such as in areas 26, 36, there is a higher concentration of the indicator dye and the color is imparted in the area. For example, if the indicator dye is violet, the areas with a higher concentration of dots have a violet color. Areas that have a lower concentration of dots, such as areas 28, 30, 32, 34, have a lower concentration of the indicator dye and the indicator dye does not impart the color, i.e., violet, in the area. While the resultant decomposed compounds exist, the concentration of the unaltered indicator dye is decreased due to the decomposition of the indicator dye. The lower concentration of indicator dye is the result of a temperature of the indicator dye exceeding a decomposition temperature of the indicator dye and the subsequent chemical decomposition of the indicator dye. Still referring to FIG. 1, because the first lift 20 was not allowed to cool adequately, an exotherm generated by the formation of the second lift 22 caused the temperature of the indicator dye to exceed the decomposition temperature of the indicator dye, especially at the pass-line. In turn, the chemical decomposition of the indicator dye occurred. Consequently, the concentration of indicator dye in the first and the second lift 20, 22 at the pass-line 24 decreased significantly, i.e., the color in the first lift 20 and the second lift 22 at the pass-line 24 changed from violet to cream.

Referring now to FIG. 2, a cross-section of the polyurethane foam article of the present invention is generally shown at 10. The polyurethane foam article comprises the first lift 20, the second lift 22, and the pass-line 24 therebetween. The first lift 20 is formed by spray application of a reaction mixture onto the substrate 25. The second lift 22 is formed by spray application of the reaction mixture onto the first lift 20. The second lift 22 is formed 20 minutes after the first lift 20 is formed. When each of the first and the second lifts 20, 22 are formed, the indicator dye is concentrated or dispersed evenly in the lift, respectively, imparting a color in the respective lift. The first lift 20 has a thickness $T_1$ of about 50 mm and the second lift 22 has a thickness $T_2$ of about 50 mm. Accordingly, the polyurethane foam article 10 has a thickness $T_3$ of about 100 mm. For purposes of this description, the first and second lifts 20, 22 are each individually divided in into three areas and the areas are defined as areas 26, 28, 30, 32, 34, 36. The dots represent the indicator dye, which imparts the color in the first and second lifts 20, 22 and at the pass-line 24. In areas where there is a higher concentration of dots, such as in areas 26, 30, 32, and 36, a higher concentration of the indicator dye is present and the color is imparted in the area. For example, if the indicator dye is violet, the areas with a higher concentration of dots are violet. In areas where there is a lower concentration of dots, such as areas 28 and 34, there is a lower concentration of the indicator dye and the indicator dye does not impart the color, i.e., violet, in the example above, to the area. In areas where there is a lower concentration of dots there is a lower concentration of indicator dye as a result of a temperature of the indicator dye exceeding the decomposition temperature of the indicator dye and the subsequent chemical decomposition of the indicator dye. While the resultant decomposed compounds exist, the concentration of the unaltered indicator dye is decreased due to the decomposition of the indicator dye. Still referring to FIG. 2, because the first lift 20 was allowed to cool adequately, an exotherm generated by the formation of the second lift 22 did not increase the temperature of the indicator dye over the decomposition temperature of the indicator dye at the pass-line 24. Consequently, the concentration of indicator dye in the first and the second lift 20, 22 and at the pass-line 24 did not decrease significantly, i.e., the color in the first lift 20 and the second lift 22 at the pass-line 24 remained violet.

Referring now to FIG. 3, a cross-section of the polyurethane foam article of the prior art is generally shown at 10. The polyurethane foam article comprises the first lift 20, the second lift 22, and the pass-line 24 therebetween. The first lift 20 is formed by spray application of a reaction mixture onto the substrate 25. The isocyanate-reactive resin composition comprises a non-indicator dye, which is not the indicator dye. The non-indicator dye does not decompose during or after the exothermic reaction of the reaction mixture in response to a temperature of the non-indicator dye. The second lift 22 is formed by spray application of the reaction mixture onto the first lift 20. The second lift 22 is formed 2 minutes after the first lift 20 is formed. When each of the first and the second lift 20, 22 is formed, the non-indicator dye is concentrated or dispersed evenly throughout the lift, respectively, imparting a color to the lift. For example, if the non-indicator dye is violet, a violet color is imparted to the lift. The first lift 20 has a thickness $T_1$ of about 50 mm and the second lift 22 has a thickness $T_2$ of about 50 mm. Accordingly, the polyurethane foam article 10 has a thickness $T_3$ of about 100 mm. For purposes of this description, the first and second lifts 20, 22 are each individually divided in into three areas and the areas are defined as areas 26, 28, 30, 32, 34, 36. The dots represent the non-indicator dye, which imparts a color to the first and second lifts 20, 22. Areas having a higher concentration of dots have a higher concentration of the non-indicator dye— and color is imparted in the area. In areas where there is a lower concentration of dots, there is decreased concentration of non-indicator dye. In this example, the concentration of dots in areas 26, 28, 30, 32, 34, 36, is the same higher concentration in all areas. Accordingly, all of the areas are violet. Although, the second lift 22 was formed on the first lift 20 2 minutes after the formation of the first lift 20 and an exotherm generated by the formation of the second lift 22 went uncontrolled causing an increase in temperature, there is no indication of such. The non-indicator dye did not decompose and impart a change in color in the first or the second lift 22, 24. The concentration of non-indicator dye in the first and the second lifts 20, 22 and at the pass-line 24 is unchanged and consistent, i.e., the color in the first lift 20 and the second lift 24 at the pass-line 24 is violet. Likewise, in a situation where the second lift 22 is formed onto the first lift 20 20 minutes after the first lift 20 is formed, the concentration of non-indicator dye in the first and the second lifts 20, 22 and at the pass-line 24 is unchanged and consistent, i.e., the color in the first lift 20 and the second lift 24 and at the pass-line 24 is violet.

The following examples are intended to illustrate the present invention and are not to be viewed in any way as limiting to the scope of the present invention.

EXAMPLES

Examples 1-6 and Comparative Example 1 are described herein. Referring now to Table 1, a series of polyurethane systems is collectively described. The polyurethane systems of Examples 1-6 are in accordance with the present invention. The polyurethane system of Comparative Example 1 is not in accordance with the present invention. The amounts in Table 1 are in PPH resin composition, with the exception of the isocyanate index that is listed.

TABLE 1

| Component | Ex. 1 | Ex. 2 | Ex. 3 | Ex. 4 | Ex. 5 | Ex. 6 | Comp. Ex. 1 |
|---|---|---|---|---|---|---|---|
| Polyol A | 30.15 | 30.15 | 30.30 | 30.15 | 0.00 | 14.46 | 30.15 |
| Polyol B | 0.00 | 0.00 | 0.00 | 0.00 | 50.34 | 0.00 | 0.00 |
| Polyol C | 3.50 | 3.50 | 3.50 | 3.50 | 0.00 | 0.00 | 3.50 |
| Polyol D | 23.25 | 23.25 | 23.25 | 23.25 | 24.96 | 0.00 | 23.25 |
| Polyol E | 0.00 | 0.00 | 0.00 | 0.00 | 0.00 | 23.95 | 0.00 |
| Polyol F | 0.00 | 0.00 | 0.00 | 0.00 | 0.00 | 19.97 | 0.00 |
| Flame Retardant A | 15.00 | 15.00 | 15.00 | 15.00 | 0.00 | 19.97 | 15.00 |
| Flame Retardant B | 0.00 | 0.00 | 0.00 | 0.00 | 4.99 | 0.00 | 0.00 |
| Surfactant A | 1.50 | 1.50 | 1.50 | 1.50 | 0.00 | 1.00 | 1.50 |
| Surfactant B | 0.00 | 0.00 | 0.00 | 0.00 | 1.00 | 0.00 | 0.00 |
| Surfactant C | 0.00 | 0.00 | 0.00 | 0.00 | 0.00 | 1.00 | 0.00 |
| Catalyst A | 0.32 | 0.32 | 0.32 | 0.32 | 0.00 | 0.00 | 0.32 |
| Catalyst B | 0.09 | 0.09 | 0.09 | 0.09 | 0.00 | 0.18 | 0.09 |
| Catalyst C | 0.00 | 0.00 | 0.00 | 0.00 | 0.69 | 0.00 | 0.00 |
| Catalyst D | 0.00 | 0.00 | 0.00 | 0.00 | 0.59 | 0.00 | 0.00 |
| Catalyst E | 0.00 | 0.00 | 0.00 | 0.00 | 3.49 | 0.00 | 0.00 |
| Catalyst F | 0.00 | 0.00 | 0.00 | 0.00 | 0.00 | 3.00 | 0.00 |
| Catalyst G | 0.00 | 0.00 | 0.00 | 0.00 | 0.00 | 0.75 | 0.00 |
| Additive A | 0.00 | 0.00 | 0.00 | 0.00 | 4.99 | 0.00 | 0.00 |
| Additive B | 0.00 | 0.00 | 0.00 | 0.00 | 0.10 | 0.00 | 0.00 |
| Additive C | 0.00 | 0.00 | 0.00 | 0.00 | 0.00 | 0.00 | 0.30 |
| Blowing Agent A | 0.10 | 0.10 | 0.10 | 0.10 | 1.70 | 2.30 | 0.10 |
| Blowing Agent B | 0.00 | 0.00 | 0.00 | 0.00 | 6.99 | 13.28 | 0.00 |
| Blowing Agent C | 24.00 | 24.00 | 24.00 | 24.00 | 0.00 | 0.00 | 24.00 |
| Blowing Agent D | 1.80 | 1.80 | 1.80 | 1.80 | 0.00 | 0.00 | 1.80 |
| Indicator Dye A | 0.00 | 0.00 | 0.00 | 0.30 | 0.00 | 0.00 | 0.00 |
| Indicator Dye B | 0.00 | 0.30 | 0.00 | 0.00 | 0.00 | 0.00 | 0.00 |
| Indicator Dye C | 0.30 | 0.00 | 0.15 | 0.00 | 0.15 | 0.15 | 0.00 |
| Isocyanate | ELASTOSPRAY ® 8000 A Isocyanate | | | | | | |
| Isocyanate Index | 108.76 | 108.76 | 108.46 | 108.76 | 112.46 | 115.68 | 108.76 |

Polyol A is an amine initiated polyether polyol having a hydroxyl number of from about 300 to about 900 mg KOH/g and a functionality of from about 2 to about 5.

Polyol B is a polyester polyol having a hydroxyl number of from about 180 to about 450 mg KOH/g and a functionality of from about 1.9 to about 2.5.

Polyol C is a bio-based polyol.

Polyol D is a Mannich based polyether polyol having a hydroxyl number of from about 300 to about 600 mg KOH/g and a functionality of from about 2.5 to about 5.

Polyol E is a Mannich based polyether polyol having a hydroxyl number of from about 300 to about 600 mg KOH/g and a functionality of from about 2.5 to about 5.

Polyol F is a sucrose initiated polyether polyol having a hydroxyl number of from about 280 to about 570 mg KOH/g and a functionality of from about 4 to about 6.5.

Flame Retardant A is tris (chloroisopropyl)phosphate.

Flame Retardant B is tetrabromophthalate diol.

Surfactant A is a non-silicone surfactant.

Surfactant B is a silicone based co-polymer surfactant.

Surfactant C is a silicone surfactant.

Catalyst A is an amine catalyst.

Catalyst B is a lead catalyst.

Catalyst C is a bismuth catalyst.

Catalyst D is an amine catalyst.

Catalyst E is 2-(dimethylamino) ethanol.

Catalyst F is a solution of 33% triethylenediamine and 67% dipropylene glycol.

Catalyst G is pentamethyldiethylenetriamine.

Additive A is triethyl phosphate.

Additive B is a heat stabilizer.

Additive C is a reactive polymeric colorant.

Blowing Agent A is water, a chemical blowing agent.

Blowing Agent B is 1,1,1,3,3-pentafluoropropane, a physical blowing agent.

Blowing Agent C is 1,1-dichloro-1-fluoroethane, a physical blowing agent.

Blowing Agent D is 1-chloro-1,1-difluoroethane, a physical blowing agent.

Indicator Dye A is N,N-diethylaniline, which has a violet color.

Indicator Dye B is 94-(Bis(4-(dimethylamino)phenyl)methylene)-2,5-cyclohexadien-1-ylidene)dimethyl ammonium acetate, which has a violet color.

Indicator Dye C is a triphenyl methane dye, which has a violet color.

ELASTOSPRAY® 8000A is a polymeric isocyanate sold under the tradename ELASTOSPRAY®.

The polyurethane systems of Examples 1-6 are used to form Articles 1-6, A and B. The polyurethane system of Comparative Example 1 is used to form Comparative Articles 1 A and 1 B. Articles 1-6, A and B and Comparative Articles 1 A and 1 B are prepared with a stoichometric excess of the isocyanate, according to isocyanate indexes listed in Table 1. The isocyanate-reactive resin composition and the isocyanate are combined in a spray nozzle, to form each individual reaction mixture. Each individual reaction mixture is spray applied onto a substrate, in these examples cardboard, to form a first lift having a thickness of 50 mm. Again, the isocyanate-reactive resin composition is mixed with the isocyanate to form each individual reaction mixture, and each individual reaction mixture spray applied onto the first lift to form a second lift having a thickness of 50 mm. A time between the formation of the first lift and the second lift, herein referred to as Time 1, varies depending on the Article or the Comparative Article. As such, Articles 1-6, A and B and Comparative Articles 1 A and 1 B are polyurethane foam articles comprising the first lift, the second lift, and the pass-line therebetween.

A cross-section of each individual Article and Comparative Article is extracted by cutting out a sample from each individual Article and Comparative Article. Once the cross-section is extracted, the cross-section is visually examined to determine the color in the first lift and in the second lift and at the pass-line.

In Table 2, Articles 1-6 A and B and Comparative Articles 1 A and 1 B are described and results of the visual examination of each individual cross-section are documented. Comparative Articles 1 A and 1 B are included to provide a basis for comparison for the unexpected and advantageous effects of the indicator dye of Examples 1-6. Comparative Articles A and B are do not include the indicator dye of the present invention, Articles A and B are Formed from the Polyurethane System of Comparative Example 1 which comprises a non-indicator dye.

TABLE 2

| Article/ Comp. Article | Polyurethane System | Time 1 (min) | Visual Exam. Results | Notes |
| --- | --- | --- | --- | --- |
| Article 1A | Ex. 1 | 2 | Color Change at Pass-line | Poor bond at the pass-line or interface between the lifts. |
| Article 1B | Ex. 1 | 20 | Color at Pass-line | |
| Article 2A | Ex. 2 | 2 | Color Change at Pass-line | Poor bond at the pass-line or interface between the lifts. |
| Article 2B | Ex. 2 | 20 | Color at Pass-line | |
| Article 3A | Ex. 3 | 2 | Color Change at Pass-line | Poor bond at the pass-line or interface between the lifts. |
| Article 3B | Ex. 3 | 20 | Color at Pass-line | |
| Article 4A | Ex. 4 | 2 | Color Change at Pass-line | Poor bond at the pass-line or interface between the lifts. |
| Article 4C | Ex. 4 | 20 | Color at Pass-line | |
| Article 5A | Ex. 5 | 2 | Color Change at Pass-line | Poor bond at the pass-line or interface between the lifts. |
| Article 5B | Ex. 5 | 20 | Color at Pass-line | |
| Article 6A | Ex. 6 | 2 | Color Change at Pass-line | Poor bond at the pass-line or interface between the lifts. |
| Article 6B | Ex. 6 | 20 | Color at Pass-line | |
| Comp. Article. 1A | Comp. Ex. 1 | 2 | Color at Pass-line | Poor bond at the pass-line or interface between the lifts. |
| Comp. Article 1B | Comp. Ex. 1 | 20 | Color at Pass-line | |

The second lift of Articles 1-6 A is formed 2 minutes after the first lift is formed, respectively. As noted in Table 2 above, because the lifts were formed in quick succession, the bond between the lifts is not homogeneous. As described in Table 2 above, a visual examination of each individual cross-section of Articles 1-6 A reveals a change in color in the first and the second lifts and at the pass-line, i.e., the color changed from violet to cream. The change in color indicates that the lifts were formed in quick succession—that the first lift did not cool adequately prior to the formation of the second lift. In other words, during or after the reaction of the isocyanate-reactive resin composition and the isocyanate to form the second lift a temperature of the indicator dye exceeded a decomposition temperature of the indicator dye and the indicator dye chemically decomposed near the pass-line. In Articles 1-6 A, the decomposition of the indicator dye occurred, i.e., the color changed from violet to a cream, in the lifts and at the pass-line. In Articles 1-6 A, the color at the pass-line is cream.

In contrast, the second lift of Articles 1-6 B, is formed 20 minutes after the first lift is formed, respectively. As described in Table 2, a visual examination of each individual cross-section from Articles 1-6 B does not reveal a change in color in the first and the second lifts and at the pass-line, i.e., the color remained violet. As such, this color, or lack of the change in color, indicates that the first lift cooled adequately following the exothermic reaction of the isocyanate-reactive resin composition and the isocyanate prior to the formation of the second lift thereon. In other words, during or after the reaction of the isocyanate-reactive resin composition and the isocyanate to form the second lift, a temperature of the indicator dye did not exceed a decomposition temperature of the indicator dye and the indicator dye did not chemically decompose near the pass-line. In Articles 1-6 B, the color at the pass-line is violet.

Comparative Articles 1 A and 1 B are not formed with the indicator dye of the present invention. The second lift of Comparative Article 1 A is formed 2 minutes after the first lift is formed. And the second lift of Comparative Example 1B is formed 20 minutes after the first lift is formed. As described in Table 2, a visual examination of each individual cross-section from Comparative Articles 1 A and 1 B does not reveal a change in color in the first and the second lift and at the pass-line. In fact, there is no change in color anywhere; the color in the first and second lifts of both Comparative Articles 1 A and 1 B is consistent. In Comparative Articles 1 A and 1 B the color in the lifts is violet. As such, there is no change in color at the pass-line. Comparative Articles 1 A and 1 B appear identical.

Advantageously, the polyurethane foam article of the subject invention improves upon the prior art. The change in color imparted by the indicator dye in the lifts and at the pass-line indicates that the lifts were formed in quick succession with inadequate cooling.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A method of forming a polyurethane foam article on a substrate, the polyurethane foam article comprising a first lift, a second lift, and a pass-line therebetween, and comprising the reaction product of an isocyanate-reactive resin composition, an isocyanate, and an indicator dye, in the presence of a blowing agent, said method comprising the steps of:
   A. providing the isocyanate-reactive resin composition;
   B. providing the isocyanate;
   C. providing the indicator dye having a decomposition temperature of from about 80° C. to about 220° C.;
   D. combining the isocyanate-reactive resin composition, the isocyanate, and the indicator dye in the presence of the blowing agent to form a reaction mixture;
   E. applying the reaction mixture onto the substrate wherein the isocyanate-reactive resin composition and the isocyanate chemically react to form the first lift and produce an exotherm, with the indicator dye imparting a color in the first lift, and if a temperature of the indicator dye meets or exceeds the decomposition temperature of the indicator dye as a result of the exotherm produced during the formation of the first lift, the indicator dye chemically decomposes to impart a change in color in the first lift; and
   F. applying the reaction mixture onto the first lift wherein the isocyanate-reactive resin composition and the isocyanate chemically react to form the second lift and produce another exotherm, with the pass-line between the first and second lifts and with the indicator dye imparting the color in the second lift, and if a temperature of the indicator dye meets or exceeds the decomposition temperature of the indicator dye as a result of the exotherm produced during the formation of the second lift, the indicator dye chemically decomposes to impart a change in color in the second lift and at the pass-line.

2. A method as set forth in claim 1 wherein the indicator dye is selected from the group of acid dyes, basic dyes, anionic direct dyes, cationic direct dyes, natural dyes, and combinations thereof.

3. A method as set forth in claim 2 wherein the indicator dye is a triphenylmethane dye.

4. A method as set forth in claim 2 wherein the indicator dye is present in the isocyanate-reactive resin composition in an amount of from about 0.001 to about 2 percent by weight, based on total weight of the isocyanate-reactive resin composition.

5. A method as set forth in claim 1 wherein the first and second lifts each independently have a thickness of from about 10 mm to about 60 mm.

6. A method as set forth in claim 5 further comprising the step of applying the reaction mixture onto the second lift to form an additional lift having a thickness of from about 10 mm to about 60 mm.

7. A method as set forth in claim 1 wherein the steps of applying the reaction mixture to form the first lift and applying the reaction mixture to form the second lift are further defined as spraying the reaction mixture at a spray pressure of from about 800 psi to about 1400 psi.

8. A method as set forth in claim 1 wherein the steps of applying the reaction mixture to form the first lift and applying the reaction mixture to form the second lift are further defined as spraying the reaction mixture at a spray rate of from about 1 lbs to about 40 lbs of the reaction mixture per minute.

9. A method as set forth in claim 1 further comprising the step of heating the isocyanate-reactive resin composition and the isocyanate to a temperature of from about 30° C. to about 55° C. prior to the step combining the isocyanate-reactive resin composition with the isocyanate.

10. A method as set forth in claim 1 wherein the isocyanate-reactive resin composition and the isocyanate are combined at an isocyanate index of from about 90 to about 130.

11. A method as set forth in claim 1 wherein the isocyanate comprises polymeric diphenylmethane diisocyanate and has a number average molecular weight of about 360 g/mol.

12. A method as set forth in claim 1 wherein said isocyanate-reactive resin composition comprises a polyol selected from the group of: an amine initiated polyether polyol having a number average molecular weight of from about 250 to about 800 g/mol, a hydroxyl number of from about 300 to about 900 mg KOH/g, and a functionality of from about 2 to about 5; a polyester polyol having a number average molecular weight of from about 300 to about 700 g/mol, a hydroxyl number of from about 180 to about 450 mg KOH/g, and a functionality of from about 1.9 to about 2.5; a Mannich based polyether polyol having a number average molecular weight of from about 250 to about 660 g/mol, a hydroxyl number of from about 300 to about 600 mg KOH/g, and a functionality of from about 2.5 to about 5; a sucrose based polyether polyol having a number average molecular weight of from about 460 to about 1200 g/mol, a hydroxyl number of from about 280 to about 570 mg KOH/g, and a functionality of from about 4 to about 6.5; and combinations thereof.

13. A polyurethane foam article which comprises a first lift, a second lift, and a pass-line therebetween, said article comprising the reaction product of:
A. an isocyanate-reactive resin composition;
B. an isocyanate; and
C. an indicator dye having a decomposition temperature of from about 80° C. to about 220° C.;
in the presence of a blowing agent;
wherein said isocyanate-reactive resin composition and said isocyanate chemically react to form said first lift and produce an exotherm, and form said second lift and produce another exotherm; and
wherein said indicator dye imparts a color in said first and second lifts and at said pass-line at a first temperature below a decomposition temperature of said indicator dye and chemically decomposes to impart a change in color in said first and second lifts and at said pass-line at a second temperature which is at or above said decomposition temperature of said indicator dye.

14. A polyurethane foam article as set forth in claim 13 wherein said indicator dye is selected from the group of acid dyes, basic dyes, anionic direct dyes, cationic direct dyes, natural dyes, and combinations thereof.

15. A polyurethane foam article as set forth in claim 13 wherein said indicator dye is a triphenylmethane dye.

16. A polyurethane foam article as set forth in claim 13 wherein said indicator dye is present in said isocyanate-reactive resin composition in an amount of from about 0.001 to about 2 percent by weight, based on total weight of said isocyanate-reactive resin composition.

17. A polyurethane foam article as set forth in claim 13 wherein said first and second lifts each independently have a thickness of from about 10 mm to about 60 mm.

18. A polyurethane foam article as set forth in claim 17 further comprising at least one additional lift having a thickness of from about 10 mm to about 60 mm.

19. A polyurethane foam article as set forth in claim 13 wherein said isocyanate-reactive resin composition and said isocyanate react at an isocyanate index of from about 90 to about 130.

20. A polyurethane foam article as set forth in claim 13 wherein said isocyanate comprises polymeric diphenylmethane diisocyanate and has a number average molecular weight of about 360 g/mol.

21. A polyurethane foam article as set forth in claim 13 wherein said isocyanate-reactive resin composition comprises a polyol selected from the group of: an amine initiated polyether polyol having a number average molecular weight of from about 250 to about 800 g/mol, a hydroxyl number of from about 300 to about 900 mg KOH/g, and a functionality of from about 2 to about 5; a polyester polyol having a number average molecular weight of from about 300 to about 700 g/mol, a hydroxyl number of from about 180 to about 450 mg KOH/g, and a functionality of from about 1.9 to about 2.5; a Mannich based polyether polyol having a number average molecular weight of from about 250 to about 660 g/mol, a hydroxyl number of from about 300 to about 600 mg KOH/g, and a functionality of from about 2.5 to about 5; a sucrose based polyether polyol having a number average molecular weight of from about 460 to about 1200 g/mol, a hydroxyl number of from about 280 to about 570 mg KOH/g, and a functionality of from about 4 to about 6.5; and combinations thereof.

22. A polyurethane system for use in forming a polyurethane foam article which comprises a first lift and a second lift and a pass-line therebetween, said polyurethane system comprising:
A. an isocyanate-reactive resin composition comprising a polyol selected from the group of: an amine initiated polyether polyol having a number average molecular weight of from about 250 to about 800 g/mol, a hydroxyl number of from about 300 to about 900 mg KOH/g, and a functionality of from about 2 to about 5; a polyester polyol having a number average molecular weight of from about 300 to about 700 g/mol, a hydroxyl number of from about 180 to about 450 mg KOH/g, and a functionality of from about 1.9 to about 2.5; a Mannich based polyether polyol having a number average molecular weight of from about 250 to about 660 g/mol, a hydroxyl number of from about 300 to about 600 mg KOH/g, and a functionality of from about 2.5 to about 5; a sucrose initiated polyether polyol having a number average molecular weight of from about 460 to about 1200 g/mol, a hydroxyl number of from about 280 to about 570 mg KOH/g, and a functionality of from about 4 to about 6.5; and combinations thereof;

B. an isocyanate comprising polymeric diphenylmethane diisocyanate and having a number average molecular weight of about 360 g/mol;
C. an indicator dye comprising triphenylmethane and having a decomposition temperature of from about 80° C. to about 220° C.; and
D. a blowing agent;
wherein said isocyanate-reactive resin composition and said isocyanate chemically react to form said first lift and produce an exotherm, and form said second lift and produce another exotherm; and
wherein said indicator dye imparts a color in said first and second lifts and at said pass-line at a first temperature below said decomposition temperature of said indicator dye and chemically decomposes to impart a change in color in said first and second lifts and at said pass-line at a second temperature which is at or above said decomposition temperature of said indicator dye.

23. A method as set forth in claim 1 further comprising the step of extracting a cross-section of the polyurethane foam article.

24. A method as set forth in claim 23 further comprising the step of visually examining the cross-section of the polyurethane foam article having the pass-line.

* * * * *